(12) United States Patent
Shike

(10) Patent No.: US 8,479,580 B2
(45) Date of Patent: Jul. 9, 2013

(54) PRESSURE TRANSDUCER ARRANGEMENT

(75) Inventor: David Shike, Rockton, IL (US)

(73) Assignee: Schneider Electric Buildings, LLC, North Andover, MA (US)

( * ) Notice: Subject to any disclaimer, the term of this patent is extended or adjusted under 35 U.S.C. 154(b) by 191 days.

(21) Appl. No.: 13/030,769

(22) Filed: Feb. 18, 2011

(65) Prior Publication Data

US 2012/0210798 A1 Aug. 23, 2012

(51) Int. Cl.
*G01L 13/00* (2006.01)

(52) U.S. Cl.
USPC .............................................. 73/716; 73/736

(58) Field of Classification Search
USPC .................................................. 73/700–756
See application file for complete search history.

(56) References Cited

U.S. PATENT DOCUMENTS

| | | | |
|---|---|---|---|
| 4,817,022 A | 3/1989 | Jornod et al. | |
| 5,412,992 A | 5/1995 | Tobita et al. | |
| 5,531,120 A * | 7/1996 | Nagasu et al. | 73/706 |
| 5,601,071 A * | 2/1997 | Carr et al. | 126/116 A |
| 6,035,724 A * | 3/2000 | Hewson | 73/756 |
| 6,120,457 A | 9/2000 | Coombes et al. | |
| 6,590,267 B1 | 7/2003 | Goodwin-Johansson et al. | |
| 7,448,412 B2 | 11/2008 | Teach et al. | |
| 2002/0095973 A1 | 7/2002 | Cole | |
| 2005/0150304 A1* | 7/2005 | Gustafson et al. | 73/754 |

FOREIGN PATENT DOCUMENTS

JP 9-243490 9/1997

* cited by examiner

*Primary Examiner* — Andre Allen
(74) *Attorney, Agent, or Firm* — Reinhart Boerner Van Deuren P.C.

(57) ABSTRACT

A pressure transducer arrangement and method of operation is provided. The pressure transducer and methods of operation reduce error in determining an offset value by eliminating error relating to fluid flow through the transducer arrangement when the offset value is determined. In a particular embodiment, the apparatus and method includes a lockout valve that prevents fluid flow between first and second fluid pressure sources when the offset value is determined.

21 Claims, 2 Drawing Sheets

PRESSURE TRANSDUCER ARRANGEMENT

FIELD OF THE INVENTION

This invention generally relates to pressure transducers and more particularly to compensation for, or the elimination of, inaccuracies in the signaled value of the pressure as a result of variations in conditions to which the transducer is subjected.

BACKGROUND OF THE INVENTION

Heating, ventilating, and air-conditioning systems (HVAC systems) use a plurality of ducts to distribute conditioned air throughout buildings. Depending on the temperature in a room or need to adjust the temperature in the room, the HVAC system will adjust the flow of conditioned air into the room.

In the past, the flow rate of the air was monitored using a velocity pressure transducer using a piezo-electric pressure transducer coupled to a pitot tube positioned within the air stream through the duct. One example of such a transducer is illustrated in U.S. Pat. No. 4,817,022, granted on Mar. 28, 1989 to Jornod et al. As illustrated therein, because the signal generated by the piezo-electric transducer is affected by physical changes in the transducer, one feature of the '022 patent was a method and apparatus for compensating for changes in the physical properties, such as temperature, of the transducer by using a zeroing process to eliminate offset or drift errors that can be caused by the changes in the physical properties of the transducer.

During normal operation, the transducer was exposed to a differential pressure caused by the different locations of ports in the pitot tube. This differential pressure was sensed by applying the different pressures to opposite sides of the piezo-electric pressure transducer and then used to determine the flow rate of the of air. Every so often, the system would "zero" the pressure across the transducer by determining an offset generated by changes in the physical properties of the transducer. To do this, the system would apply substantially equal pressures to both sides of the transducer such that the pressure drop across the transducer was believed to be effectively zero. This zeroing process occurred by opening a valve to fluidly couple the high and low pressure sides of the transducer, such that substantially identical pressures were believed to be exposed to both sides of the transducer. In this substantially zero pressure state, a reading was taken and this was used as an offset value.

Unfortunately, the size of ducts in commercial and residential building has been increasing in cross-section such that the actual speed of the air flowing through the ducts has reduced. Thus, the pressure transducers are being used to sense smaller and smaller pressure values.

However, when the valve opens to take the zero pressure reading air will flow through the valve while the pressure reading is being taken. This airflow causes a residual pressure drop that introduces an error in the zero pressure measurement. Because the transducers can be employed to measure velocity pressures as low as 0.004 in.WC (1 Pa), this error can be significant.

Therefore, there is a need in the art to eliminate or even further reduce any potential error in the zero pressure measurement.

BRIEF SUMMARY OF THE INVENTION

Embodiments of the present invention provide a new and improved pressure transducer arrangement and methods of operation of a pressure transducer arrangement. The new and improved pressure transducer arrangement and methods of operation further eliminate any offset errors generated during zeroing operations that account for changes in physical properties of the pressure transducer arrangement.

In one particular embodiment, a pressure transducer arrangement comprising a body, a bypass valve, a pressure sensor and a lockout valve is provided. The body has a first chamber in fluid communication with a first inlet. A second chamber is in fluid communication with a second inlet. A bypass channel fluidly couples the first chamber with the second chamber. The bypass valve has an open state allowing fluid communication between the first and second chambers through the bypass channel. The bypass valve has a closed state preventing fluid communication between the first and second chambers through the bypass channel. The pressure sensor is interposed between the first and second chambers arranged to sense the pressure differential between the first and second chambers. The lock out valve is interposed between the first inlet and the first chamber. The lockout valve has an open state allowing fluid communication between the first inlet and the first chamber. The lock out valve has a closed state preventing fluid communication between the first inlet and the first chamber.

In a more particular embodiment, the bypass valve and the lockout valve are in fluid series. When the bypass valve and lockout valve are both open, a continuous flow passage is formed from the first inlet to the second inlet. In a more particular embodiment, the continuous passage includes the first chamber, the bypass channel and the second chamber.

In a further particular embodiment, when at least one of the bypass valve and the lockout valve are closed, the first inlet and second inlet do not fluidly communicate through the bypass channel.

In another more particular embodiment, the first inlet, first chamber, bypass channel, second chamber and second inlet are arranged in fluid series and the bypass valve is interposed between the first and second chambers and the lockout valve is interposed between the first inlet and the first chamber.

In another particular embodiment, the bypass valve and the lockout valve are MEMS valves.

In another particular embodiment, the bypass valve and the lockout valve are solenoid valves.

In another particular embodiment, the pressure transducer arrangement includes a pitot tube, the pitot tube defines the first inlet and the second inlet. In an even more particular embodiment, a first tube is interposed between the first inlet and the first chamber and a second tube is interposed between the second inlet and the second chamber. In an even more particular embodiment, the lockout valve is interposed between the first tube and the first chamber.

In one method, a method of operating a pressure transducer arrangement including a pressure sensor is provided. The pressure transducer arrangement is exposed to a first and second fluid pressure source is provided. The method includes exposing a first side of the pressure sensor to the second fluid pressure source; exposing a second side of the pressure sensor to the second fluid pressure source; preventing fluid flow between the first and second fluid pressure sources through the pressure transducer arrangement; and taking a zero pressure reading while both the first and second sides of the pressure sensor are exposed to the second fluid pressure source and fluid is prevented from flowing between the first and second fluid pressure source through the pressure transducer arrangement.

In a particular implementation of the method, the method further includes preventing exposure of the first side of the pressure sensor to the second fluid pressure source, after taking a zero pressure reading; exposing the first side of the pressure sensor to the first fluid pressure source, after taking a zero pressure reading; and taking a sample pressure reading.

In an even more particular implementation of the method, the method further includes exposing, for a second time, the first side of the pressure sensor to the second fluid pressure source; preventing fluid flow between the first and second fluid pressure sources through the pressure transducer arrangement; and taking a second zero pressure reading while both the first and second sides of the pressure sensor are exposed to the second fluid pressure source and fluid is prevented from flowing between the first and second fluid pressure source through the pressure transducer arrangement.

In a more particular implementation of the method, the method includes taking a second sample pressure reading prior to the step of exposing, for a second time, the second side of the pressure sensor to the second fluid pressure source.

In one particular implementation, the pressure transducer arrangement further includes: a first chamber in fluid communication with the first pressure source, a second chamber in fluid communication with the second fluid pressure source, and a bypass channel fluidly coupling the first chamber with the second chamber; a bypass valve having an open state allowing fluid communication between the first and second chambers through the bypass channel and a closed state preventing fluid communication between the first and second chambers through the bypass channel; a lock out valve interposed between the first inlet and the first chamber, the lockout valve having an open state allowing fluid communication between the pressure source and the first chamber and a closed state preventing fluid communication between the first pressure source and the first chamber; and wherein the pressure sensor is interposed between the first and second chambers with the first side exposed to the first chamber and the second side exposed to the second chamber, the pressure sensor arranged to sense the pressure differential between the first and second chambers. The method further includes exposing a first side of the pressure sensor to the second fluid pressure source by opening the bypass valve and preventing fluid flow between the first and second fluid pressure sources through the pressure transducer arrangement by closing the lockout valve.

In a more particular implementation, the method includes preventing exposure of the first side of the pressure sensor to the second fluid pressure source, after taking a zero pressure reading, including closing the bypass valve; exposing the first side of the pressure sensor to the first fluid pressure source, after taking a zero pressure reading, including opening the lockout valve; and taking a sample pressure reading. In an even more particular implementation, the method includes exposing, for a second time, the first side of the pressure sensor to the second fluid pressure source, which includes opening, for a second time, the bypass valve; preventing fluid flow between the first and second fluid pressure sources through the pressure transducer arrangement by closing the lockout valve; and taking a second zero pressure reading while both the first and second sides of the pressure sensor are exposed to the second fluid pressure source and fluid is prevented from flowing between the first and second fluid pressure source through the pressure transducer arrangement.

A further method of operating a pressure transducer arrangement is provided. The pressure transducer arrangement includes: a first chamber in fluid communication with a first pressure source, a second chamber in fluid communication with a second fluid pressure source, and a bypass channel fluidly coupling the first chamber with the second chamber; a bypass valve having an open state allowing fluid communication between the first and second chambers through the bypass channel and a closed state preventing fluid communication between the first and second chambers through the bypass channel; a lock out valve interposed between the first inlet and the first chamber, the lockout valve having an open state allowing fluid communication between the first pressure source and the first chamber and a closed state preventing fluid communication between the first pressure source and the first chamber; and a pressure sensor is interposed between the first and second chambers with a first side exposed to the first chamber and the second side exposed to the second chamber, the pressure sensor arranged to sense the pressure differential between the first and second chambers. The method includes communicating, fluidly, the first and second chambers to fluidly expose the first and second sides of the pressure sensor to the second fluid pressure source by opening the bypass valve; preventing fluid flow between the first and second fluid pressure sources through the pressure transducer arrangement by closing the lockout valve; and taking a zero pressure reading.

In a more particular implementation, a method includes preventing fluid communication between the first and second chambers by closing the bypass valve; fluidly communicating the first side of the pressure sensor to the first fluid pressure source by opening the lockout valve; and taking a first sample pressure reading.

In an even more particular implementation, a method includes fluidly communicating the first and second chambers for a second time by opening the bypass valve for a second time; preventing fluid flow between the first and second fluid pressure sources through the pressure transducer arrangement by closing the lockout valve for a second time; and taking a second zero pressure reading.

In even more particular implementation, a method includes taking a plurality of sample pressure readings prior to a) opening the bypass valve for a second time, b) closing the lockout valve for a second time and c) taking a second zero pressure reading.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
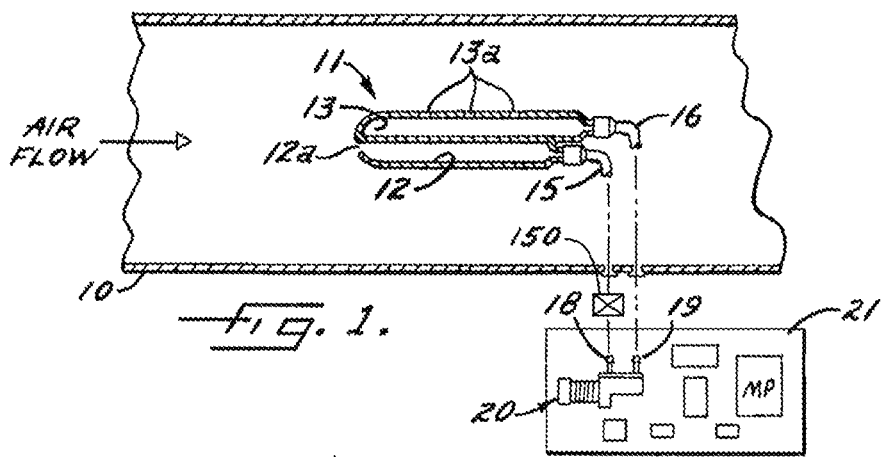
FIG. 1 is a simplified cross-sectional illustration of a pressure transducer arrangement in its operating environment according to an exemplary embodiment of the present invention.

As a typical application utilizing a parameter-sensing transducer system, FIG. 1 illustrates a duct 10 of an HVAC system through which air is pumped by a blower (not shown) into a space or room whose temperature is to be controlled. The temperature of that space is in part controlled by varying the speed of the blower (or changing the positions of dampers which admit air into the duct) and thus varying the volumetric rate and velocity of the air stream moving though the duct. The particular rationale for controlling the velocity of the air stream has no direct relevance to the present invention; it will be sufficient to observe simply that the overall control system needs some kind of feedback signal so that it will know the actual velocity (and thus the volumetric rate) of air flowing in the duct at any time. For this purpose, a pitot tube 11 is disposed in duct.

In well known fashion, the pitot tube includes first and second chambers 12, 13 with openings 12a, 13a respectively disposed axially and transversely to the flow direction. As air flow velocity increases, the ram effect through the opening 12a increases the pressure P1 in the chamber 12. By contrast, as air flow velocity increases, the Bernoulli effect at openings 13a decreases the pressure P2 in chamber 13. By sensing and signaling the changeable physical parameter constituted by the differential pressure P1-P2, the velocity or flow rate of the air stream may be determined and utilized within the control system of the HVAC system, which is not fully shown.

Other pitot tube arrangements are also contemplated. For instance, the openings 13a for the second chamber 13 could be directed in the opposite direction as opening 12a. More particularly, 13a could face the same direction as the air flow rather than facing generally perpendicular thereto.

The changeable pressures P1 and P2 are transmitted via tubes 15 and 16 to the inlets 18 and 19 of a transducer unit 20. The combination of the pressure transducer unit 20 and the pitot tube 11 can be referred to as a pressure transducer arrangement. However, not all embodiments of a pressure transducer arrangement need also include the pitot tube 11.

In the illustrated embodiment, the unit 20 is physically mounted on a printed circuit board 21 disposed exteriorly of the duct 10. In simple terms, the transducer in the unit 20 produces an electric analog signal which changes as a known function with changes in the differential pressure P1-P2 and which thus is a representation, according to a known transfer function, of the value of such differential pressure. The electrical signal maybe generally referred to as a pressure reading.

Pressure is frequently expressed in known units of "inches of water column" (in.WC). In the present case, the air velocity in the duct may fall anywhere within a range which makes the differential pressure fall between zero and about 1.5 in.WC. Since 1.0 in.WC equates to 0.036 pounds per square inch (p.s.i.), it may be seen that the full range of sensed differential pressure extends from zero to about 0.054 p.s.i.

Due to design changes in HVAC systems for various reasons, the speed of air through duct 10 has reduced such that the differential pressure produced by the pitot tube for operating conditions of the HVAC system requires sensing and control within an even lower range than contemplated when the system of U.S. Pat. No. 4,817,022 was developed. For instance, the system is desired to be employed in systems that are required to measure velocity pressure as low as 0.004 in.WC.

The pressure transducer is of the type known as a silicon diaphragm, integrated circuit, piezoresistive bridge sensor. It is characterized by small size, low cost as a result of mass production, consistent elasticity, and reasonably linear response. The silicon "chips"—of N-type material with four P-type resistors formed by diffusion of boron into the silicon diaphragm—are available commercially and their characteristics are well known from the literature. See Application Notes TN-001 and TN-002 published in March 1985 by a company known as IC Sensors, Inc. of Milpitas, Calif. 95035. Such a silicon chip transducer is more fully described in U.S. Pat. No. 4,817,022, the teachings and disclosures of which are incorporated herein by reference thereto. Thus, only limited discussion of its operation will be described herein.

Unfortunately, the pressure transducer typically employed is a 5 psi pressure transducer (approximately 140 in.WC). As such, when working at the range of approximately 0.004 in.WC to about 0.008 in.WC, the pressure transducer is operating at the extreme low end of the operating range for the transducer. At these minimal pressures, any error in the system is significant. Thus, elimination of any sources of error can significantly increase the functionality of the system. Embodiments of the present invention operate to reduce a source of error in prior systems that were previously believed to be insignificant when operating at higher differential pressure values.

Figure 2:
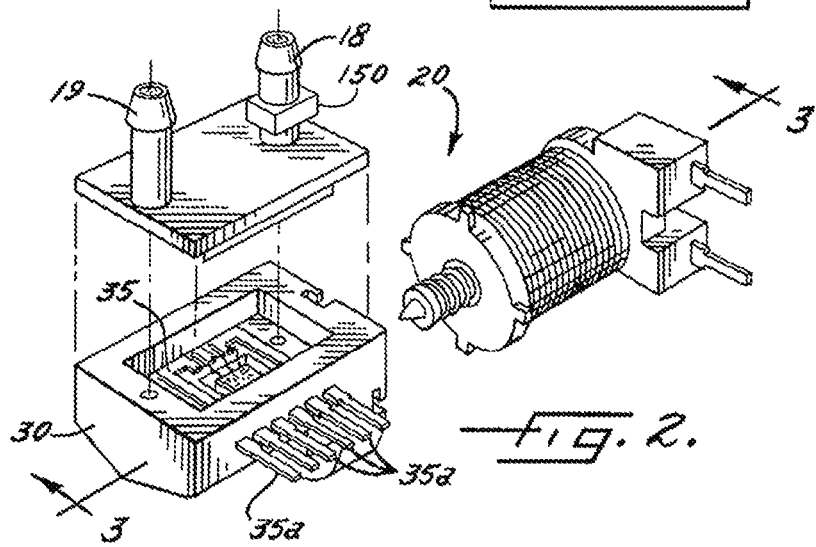
FIG. 2 is a perspective illustration of the pressure transducer unit of the pressure transducer arrangement of FIG. 1 in partial exploded view.
Figure 3:
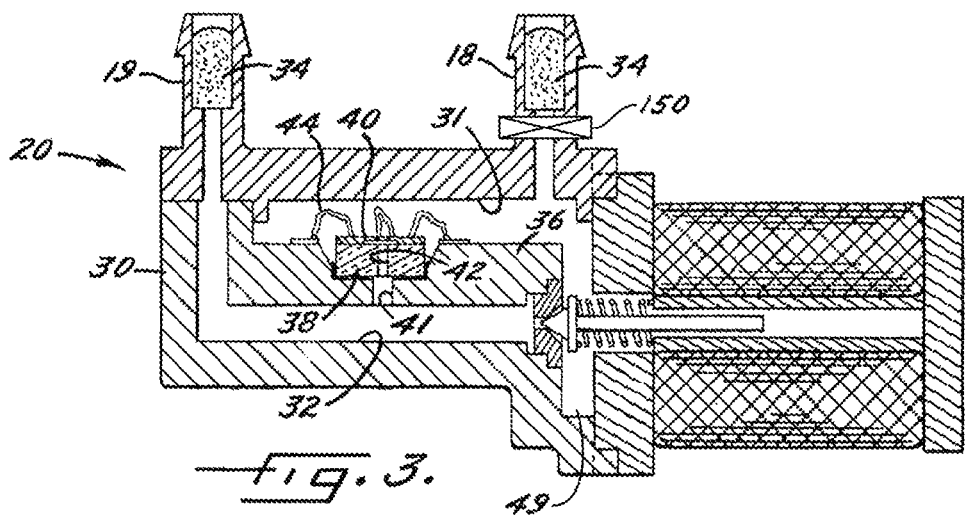
FIG. 3 is a an enlarged simplified cross-sectional illustration of the pressure transducer unit of FIG. 2.
Figure 4:
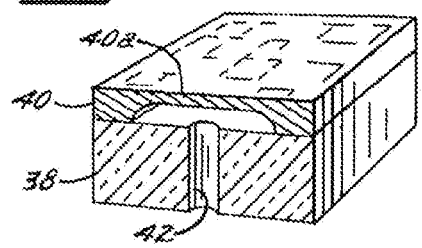
FIG. 4 is an enlarged sectioned perspective view of a silicon wafer which form part of the transducer unit of FIGS. 1-3.

As shown in FIGS. 2 and 3, the unit 20 is constituted by a body 30 of molded plastic or the like shaped to define two chambers, namely first and second chambers 31, 32 communicating respectively with the inlets 18, 19 (which contain porous filter material 34). The lower portion of the body 30 is molded to capture a lead frame 35 having six conductive ribbons on the upper surface of a horizontal partition 36 with six lead fingers 35a extending exteriorly. The central region of the partition 36 is depressed to receive a glass or Pyrex base 38 held in place by an appropriate sealing adhesive. To the upper surface of the base 38 (which is preferably made of Pyrex for a low coefficient of expansion and chemical inertness) is bonded a silicon wafer or chip 40. Aligned holes 41 and 42 in the partition and the base place the underside of the chip in communication with the chamber 32, while its upper surface is, of course, disposed in the chamber 31. As shown in FIG. 4, the underside of the chip is relieved by an etching process to create a thin central diaphragm 40a (for example, about 15 mils in thickness) which can flex or strain due to differences in pressure on its upper and lower sides.

Figure 5:
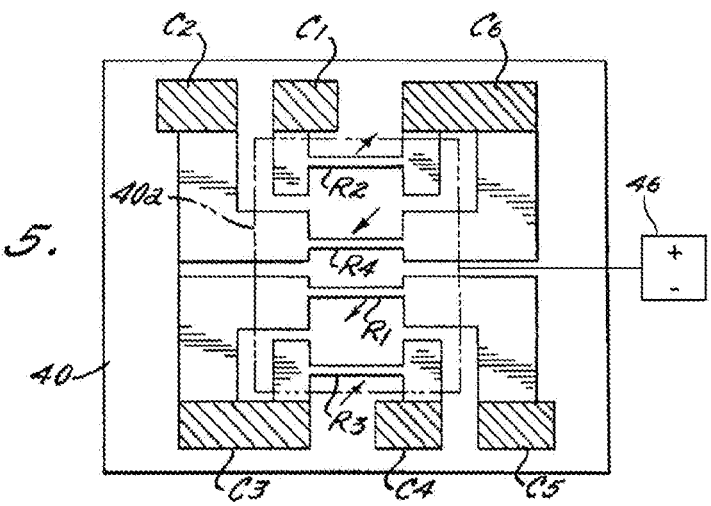
FIG. 5 is an enlarged simplified plan view of the silicon wafer in the transducer unit.

As seen in the plan view of FIG. 5, the wafer 40 (which may be, for example, about ⅛" by 3/16" in size) has four piezoresistive elements formed by diffusion on the central diaphragm. These resistors are designated R1, R2, R3, R4 and shown extending between conductive ribbons which run to connection pads C1-C6 on the thicker, peripheral portion of the chip which is bonded to the base 38. The resistors R1 and R3 share the connection pad C3, while the resistors R2 and R4 share the pad C6. With the chip and base held in the recess of the partition 36 by an appropriate sealing adhesive (FIG. 3), and before the cap portion of the body 30 is cemented and sealed in place, fine lead wires 44 are electrically connected by soldering or pressure welding from each pad to a corresponding part of the lead frame, thereby establishing an electrical connection from each pad to one of the six lead fingers 35a. The cap portion of the body 30 is then cemented and hermetically sealed in place.

As further described in U.S. Pat. No. 4,817,022, when the lead fingers are appropriately connected (by insertion into a printed circuit board 21, or otherwise), the four resistors R1-R4 form a Wheatstone bridge. The bridge may be excited from a constant voltage or a constant current source (the former represented at 46) and it will therefore produce an output signal V (at the terminals corresponding to pads C6 and C3) which changes in magnitude and polarity according to the extent and sense of bridge unbalance. The resistors R1-R4 act as strain gages so that their ohmic values change with deflection of the diaphragm 40*a*, and their ohmic values also change because of a piezoresistive effect. The diaphragm 40*a* and the deposition of the resistors thereon is such that its deflection in one direction causes resistors R2 and R3 to increase in value while resistors R1 and R4 decrease in value. Thus, the bridge is "fully active" and the output voltage V changes appreciably for a given change in the differential pressure applied to the diaphragm 40*a*.

In accordance with one aspect of the present invention, a bistate device is associated with the transducer unit 20 and arranged such that in a first of its states it causes the changeable physical parameter, which is to be sensed, to be applied to the transducer. On the other hand, that bistate device is arranged and associated with means such that in the second of its two states it substitutionally applies to the transducer the same physical parameter but with a known, predetermined value.

In the specific example of the transducer unit 20, a bypass channel 49 fluidly couples the first and second chambers 31, 32. The transducer unit 20 further includes a bistate device takes the form of a solenoid bypass valve 50 controllable by energization or deenergization of its coil to reside respectively in second and first states. The bypass valve 50 is arranged such that when it is deenergized and thus closed closing bypass channel 49 and fluidly separating the first and second chambers 31, 32, the differential pressure P1-P2 is applied to the opposite sides of the transducer wafer 40. But, when excited and opened, the bypass channel 49 fluidly communicates first and second chambers 31, 32.

In this state, both chambers 31, 32 were fluidly coupled so that substantially equal pressures were exposed to these chambers 31, 32 and both sides of wafer 40. In this condition, an offset value was taken to determine external effects, such as temperature, on an offset value for the transducer unit 20. As explained in U.S. Pat. No. 4,817,022, this offset value can then be used to compensate subsequent sample pressure readings that are taken when solenoid valve 50 is closed and used to determine the actual flow rate of air through duct 10.

Unfortunately, with the bypass valve 50 open a fluid path through the transducer unit 20 between inlets 18, 19 as well as between openings 12*a* and 13*a* is opened. Thus, in the prior art design of U.S. Pat. No. 4,817,022 the air within transducer unit 20 never became completely stagnant and fluid flow through this fluid path was never zero such that the differential pressure P1-P2 across the wafer 40 during the zeroing operation was never perfectly zero. This fluid flow through the transducer unit 20 and resulting small pressure drop across wafer 40 results in error in the system.

The Applicant has determined a method to eliminate or substantially reduce the error generated by the open flow path. In the specific example of the transducer unit 20, the transducer unit 20 further includes a second bistate device that takes the form of a solenoid lockout valve 150 controllable by energization or deenergization of a coil to reside respectively in second and first states.

This lockout valve 150 is configured opposite as the bypass valve 50. The lockout valve 150 is configured and controlled such that when it is deenergized, the lockout valve 150 is in an open state. In the open state, fluid communication is permitted between chamber 12 and first chamber 31 such that during normal operation the pressure P1 of chamber 12 of pitot tube 11 is communicated to first chamber 31. But, when energized, the lockout valve 150 is in a closed state. When energized, the lockout valve 150 closes and fluidly separates chamber 12 from first chamber 31 such that the pressure P1 of chamber 12 of pitot tube 11 is not communicated to the first chamber 31.

Lockout valve 150 is shown schematically in the illustrated embodiment. In an exemplary embodiment, the lockout valve 150 is substantially similar to that of bypass valve 50, with a slight variation in the valve member of the lockout valve 150.

The position of the lockout valve 150 can be varied such that it is used to prevent the fluid flow path between openings 12*a* and 13*a* such that the air within the transducer unit 20 is stagnant during the zeroing process. As such, FIG. 1 schematically illustrates lockout valve 150 fluidly interposed between inlet 18 and pitot tube 11. However, FIGS. 2 and 3 illustrate lockout valve 150 schematically as being part of the transducer unit 20 and particularly between inlet 18 and first chamber 31. However, these are not the only places where lockout valve 150 could be positioned. For instance, the lockout valve could be positioned in inlet 19 or between inlet 19 and the pitot tube 11.

When positioned, as shown in FIGS. 2 and 3, the use of lockout valve 150 also closes off the fluid flow path through the transducer unit 20 such that the inlets 18, 19 cannot fluidly communicate via the flow path through the transducer unit 20.

When a zeroing process is desired (i.e. when it is desired to determine the offset or error value based on the current physical properties of the transducer unit 20 such as temperature), both the bypass valve 50 and lockout valve 150 are energized. Energizing of valves 50, 150 causes the bypass valve 50 to open and lockout valve 150 to close. In this configuration, first and second chambers 31, 32 fluidly communicate through bypass channel 49. However, fluid flow through the transducer unit 20 is prevented because the first and second chambers 31, 32 are only exposed to the pressure P2 of chamber 13 of pitot tube 11. With lockout valve 150 closed, the first and second chambers 31, 32 are fluidly separated from chamber 12 and pressure P1.

This configuration sets the value of the differential pressure seen by the transducer wafer 40 to a substituted, predetermined known value, which in this instance is advantageously zero. Further, because there will be no fluid flow through the transducer unit 20 because openings 12*a* and 13*a* are fluidly separated from one another, the fluid will become stagnant within the transducer unit 20 such that no fluid flows through the bypass valve 50 effectively eliminating the error effects associated with fluid flow therethrough discussed previously.

As noted above, while lockout valve 150 is illustrated in FIGS. 2 and 3 positioned between inlet 18 and first chamber 31, the transducer unit 20 could alternatively be arranged such that the lockout valve 150 is positioned between inlet 19 and second chamber 32. Further, as noted above, the lockout valve 150 could be moved to be positioned between pitot tube 11 and tubes 15, 16 or formed in line with tubes 15, 16.

Effectively, the illustrated embodiment has the following components positions in fluid series with one another. A first fluid pressure source (opening 12*a*) is in fluid series with lockout valve 150. Lockout valve 150 is in fluid series with and interposed between fluid pressure source (opening 12*a*) and a first pressure chamber 31 to which one side of wafer 40 is exposed. First pressure chamber 31 is in fluid series with and interposed between the lockout valve 150 and bypass valve 50. Bypass valve 50 is in fluid series with and interposed between first pressure chamber 31 and second pressure chamber 32 to which an opposite side of wafer 40 is exposed. The second pressure chamber 32 is in fluid series with and interposed between the bypass valve 50 and second fluid pressure source (opening 13a). Thus, when either bypass valve 50 or lockout valve 150 are closed, fluid is prevented from flowing between the pair of fluid pressure sources (openings 12a, 13a). However, when both of the bypass valve 50 and the lockout valve 150 are open, fluid is permitted to flow between the pair of fluid pressure sources (openings 12a, 13a).

Further, when the bypass valve 50 is open and the lockout valve 150 is closed, fluid is permitted to flow between the first and second pressure chambers 31, 32 to balance the pressure therein. However, fluid flow will stop and become stagnant once the pressures therein become equal.

While illustrated as incorporating solenoid activated valves 50, 150 other valves could be incorporated into the system. For instance, in some embodiments, it is desired to use MEMS (Microelectromechanical Systems) valves, such as a MEMS pneumatic valve. In one embodiment, it is contemplated that a MEMS valve such as disclosed in U.S. Pat. No. 6,590,267 entitled "Microelectromechanical Flexible Membrane Electrostatic Valve Device and Related Fabrication Methods" to Goodwin-Johansson et al, filed Sep. 14, 2000, and U.S. Pat. No. 7,448,412 entitled "Microvalve Assemblies and Related Structures and Related Methods" to Teach et al., filed Jul. 22, 2005, could be used for one or both of the valves 50, 150.

The use of MEMS valves is contemplated to provide benefits over solenoid acted valves by eliminating audible clicking of the solenoid valve that has been the cause for complaint. Further, it is contemplated that the use of MEMS valves would reduce the power consumption of the transducer unit 20 as compared to solenoid acted valves.

The solenoid bypass valve 50 in its deenergized and energized states respectively breaks or makes (interrupts or completes) a path establishing communication between the chambers 31 and 32. When the valve is energized, the pressures within those two chambers become equal, and the transducer wafer 40 sees a substituted differential pressure which is of a predetermined known value (specifically, zero).

As noted in U.S. Pat. No. 4,817,022, the transducer unit 20 is not temperature stable and changes in temperature create offsets in the operation of the transducer unit 20.

The transducer unit 20 operates substantially as in U.S. Pat. No. 4,817,022 and thus the operation, control system, and mathematics discussed in that patent will not be repeated herein, but are generally incorporated herein by reference thereto.

The process of establishing the zero pressure for determining the offset or error is modified as outlined below.

Rather than merely opening the bypass valve 50 to zero the pressure differential for wafer 40, the current system and methods also require closing the lockout valve 150. The step of closing the lockout valve 150 can be performed before, after or simultaneous with actuation of the bypass valve 50. Again, the inclusion of the lockout valve 150, and particularly the closing thereof during the zeroing process, eliminates any fluid flow through the bypass valve 50 after the system comes to a steady state pressure within both first and second chambers 31, 32.

With the lockout valve 150 closed and the bypass valve 50 open, the system will take a zero pressure measurement. After taking this zero pressure measurement, the system will proceed to close the bypass valve 50 and open the lockout valve 150. In this state, the system will take one or more sample pressure measurements. These measurements will be compensated using the zero pressure measurement.

In some instances, the zero pressure measurement is subtracted from each of the sample pressure measurements to determine the actual pressure measurements (i.e. differential pressure) at the different intervals when the sample pressure measurements were taken. This compensation can be performed at the signal level or after the signals have been converted to pressure values.

The system can reuse the zero pressure measurement for multiple sample pressure measurements or perform a zeroing operation before each sample pressure measurement is taken.

Typically, the system will perform a zeroing operation between about every 15-20 seconds. However, other intervals can be used.

It should be noted that the inlets 18, 19 are illustrated as being integrally formed from the lid portion of the transducer unit. However, inlets as used herein could also be provided as a tube connected to the inlets 18, 19 of the illustrated embodiment. And thus, if a lockout valve were positioned between the illustrated inlets 18, 19 and such a tube, the tube would take the form of the inlet as used herein. The present recitation of inlet is not limited to the illustrated embodiment. As such, the inlet need not be an integral component of the body of the transducer unit 20. Additionally, the inlet could be considered to be the actual openings 12a or 13a formed in the pitot tube 11.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pressure transducer arrangement comprising:
a body having a first chamber in fluid communication with a first inlet, a second chamber in fluid communication with a second inlet, and a bypass channel fluidly coupling the first chamber with the second chamber;
a bypass valve having an open state allowing fluid communication between the first and second chambers through the bypass channel and a closed state preventing fluid communication between the first and second chambers through the bypass channel;
a pressure sensor interposed between the first and second chambers arranged to sense the pressure differential between the first and second chambers; and
a lock out valve interposed between the first inlet and the first chamber, the lockout valve having an open state allowing fluid communication between the first inlet and the first chamber and a closed state preventing fluid communication between the first inlet and the first chamber.

2. The pressure transducer arrangement of claim 1, wherein when the bypass valve and the lockout valve in fluid series and are both open a continuous flow passage is formed from the first inlet to the second inlet.

3. The pressure transducer arrangement of claim 2, wherein the continuous passage includes the first chamber, the bypass channel and the second chamber.

4. The pressure transducer arrangement of claim 2, wherein when at least one of the bypass valve and the lockout valve is closed the first inlet and second inlet do not fluidly communicate through the bypass channel.

5. The pressure transducer arrangement of claim 1, wherein the first inlet, first chamber, bypass channel, second chamber and second inlet are arranged in fluid series and the bypass valve is interposed between the first and second chambers and the lockout valve is interposed between the first inlet and the first chamber.

6. The pressure transducer arrangement of claim 1, wherein the bypass valve and the lockout valve are MEMS valves.

7. The pressure transducer arrangement of claim 1, wherein the bypass valve and the lockout valve are solenoid valves.

8. The pressure transducer arrangement of claim 1, further including a pitot tube, the pitot tube defining the first inlet and the second inlet.

9. The pressure transducer arrangement of claim 8, further including a first tube interposed between the first inlet and the first chamber and a second tube interposed between the second inlet and the second chamber.

10. The pressure transducer arrangement of claim 9, wherein the lockout valve is interposed between the first tube and the first chamber.

11. A method of operating a pressure transducer arrangement including a pressure sensor exposed to a first and second fluid pressure source comprising:
exposing a first side of the pressure sensor to the second fluid pressure source;
exposing a second side of the pressure sensor to the second fluid pressure source;
preventing fluid flow between the first and second fluid pressure sources through the pressure transducer arrangement; and
taking a zero pressure reading while both the first and second sides of the pressure sensor are exposed to the second fluid pressure source and fluid is prevented from flowing between the first and second fluid pressure source through the pressure transducer arrangement.

12. The method of claim 11, further comprising:
preventing exposure of the first side of the pressure sensor to the second fluid pressure source, after taking a zero pressure reading;
exposing the first side of the pressure sensor to the first fluid pressure source, after taking a zero pressure reading; and
taking a sample pressure reading.

13. The method of claim 12, further comprising
exposing, for a second time, the first side of the pressure sensor to the second fluid pressure source;
preventing fluid flow between the first and second fluid pressure sources through the pressure transducer arrangement; and
taking a second zero pressure reading while both the first and second sides of the pressure sensor are exposed to the second fluid pressure source and fluid is prevented from flowing between the first and second fluid pressure source through the pressure transducer arrangement.

14. The method of claim 13, further comprising taking a second sample pressure reading prior to the step of exposing, for a second time, the second side of the pressure sensor to the second fluid pressure source.

15. The method of claim 11, wherein the pressure transducer arrangement further includes:
a first chamber in fluid communication with the first pressure source, a second chamber in fluid communication with the second fluid pressure source, and a bypass channel fluidly coupling the first chamber with the second chamber;
a bypass valve having an open state allowing fluid communication between the first and second chambers through the bypass channel and a closed state preventing fluid communication between the first and second chambers through the bypass channel;
a lock out valve interposed between the first inlet and the first chamber, the lockout valve having an open state allowing fluid communication between the pressure source and the first chamber and a closed state preventing fluid communication between the first pressure source and the first chamber; and
wherein the pressure sensor is interposed between the first and second chambers with the first side exposed to the first chamber and the second side exposed to the second chamber, the pressure sensor arranged to sense the pressure differential between the first and second chambers; and
wherein:
exposing a first side of the pressure sensor to the second fluid pressure source includes opening the bypass valve;
preventing fluid flow between the first and second fluid pressure sources through the pressure transducer arrangement includes closing the lockout valve.

16. The method of claim 15, further comprising:
preventing exposure of the first side of the pressure sensor to the second fluid pressure source, after taking a zero pressure reading, including closing the bypass valve;
exposing the first side of the pressure sensor to the first fluid pressure source, after taking a zero pressure reading, including opening the lockout valve; and
taking a sample pressure reading.

17. The method of claim 16, further comprising:
exposing, for a second time, the first side of the pressure sensor to the second fluid pressure source including opening, for a second time, the bypass valve;

preventing fluid flow between the first and second fluid pressure sources through the pressure transducer arrangement by closing the lockout valve; and taking a second zero pressure reading while both the first and second sides of the pressure sensor are exposed to the second fluid pressure source and fluid is prevented from flowing between the first and second fluid pressure source through the pressure transducer arrangement.

18. A method of operating a pressure transducer arrangement, wherein the pressure transducer arrangement includes:
   a first chamber in fluid communication with a first pressure source, a second chamber in fluid communication with a second fluid pressure source, and a bypass channel fluidly coupling the first chamber with the second chamber;
   a bypass valve having an open state allowing fluid communication between the first and second chambers through the bypass channel and a closed state preventing fluid communication between the first and second chambers through the bypass channel;
   a lock out valve interposed between the first inlet and the first chamber, the lockout valve having an open state allowing fluid communication between the pressure source and the first chamber and a closed state preventing fluid communication between the first pressure source and the first chamber; and
   a pressure sensor is interposed between the first and second chambers with a first side exposed to the first chamber and the second side exposed to the second chamber, the pressure sensor arranged to sense the pressure differential between the first and second chambers, the method comprising:
   communicating, fluidly, the first and second chambers to fluidly expose the first and second sides of the pressure sensor to the second fluid pressure source by opening the bypass valve;
   preventing fluid flow between the first and second fluid pressure sources through the pressure transducer arrangement by closing the lockout valve;
   taking a zero pressure reading.

19. The method of claim 18, further comprising:
   preventing fluid communication between the first and second chambers by closing the bypass valve;
   fluidly communicating the first side of the pressure sensor to the first fluid pressure source by opening the lockout valve; and
   taking a first sample pressure reading.

20. The method of claim 19, further comprising:
   fluidly communicating the first and second chambers for a second time by opening the bypass valve for a second time;
   preventing fluid flow between the first and second fluid pressure sources through the pressure transducer arrangement by closing the lockout valve for a second time;
   taking a second zero pressure reading.

21. The method of claim 20, further comprising taking a plurality of sample pressure readings prior to opening the bypass valve for a second time, closing the lockout valve for a second time and taking a second zero pressure reading.

* * * * *